(12) United States Patent
Morgan et al.

(10) Patent No.: US 7,073,585 B2
(45) Date of Patent: Jul. 11, 2006

(54) CEMENT COMPOSITIONS WITH IMPROVED FLUID LOSS CHARACTERISTICS AND METHODS OF CEMENTING IN SURFACE AND SUBTERRANEAN APPLICATIONS

(75) Inventors: Rickey L. Morgan, Comanche, OK (US); William J. Caveny, Rush Springs, OK (US); Ronney R. Koch, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/608,748

(22) Filed: Jun. 27, 2003

(65) Prior Publication Data

US 2004/0262000 A1 Dec. 30, 2004

(51) Int. Cl.
*E21B 33/138* (2006.01)
(52) U.S. Cl. .................. 166/294; 166/282; 166/293; 507/225; 507/226; 507/269
(58) Field of Classification Search ............ 166/283, 166/285, 292–295; 106/608, 609; 507/214, 507/225, 226, 269
See application file for complete search history.

(56) References Cited

U.S. PATENT DOCUMENTS

| | | | |
|---|---|---|---|
| 3,132,693 A | 5/1964 | Weisend | 166/33 |
| 3,359,225 A | 12/1967 | Weisend | 260/29.6 |
| 3,936,408 A | 2/1976 | Adams et al. | |
| 3,956,140 A * | 5/1976 | Nahm et al. | 507/117 |
| 3,994,852 A * | 11/1976 | Adams et al. | 523/130 |
| 4,011,909 A | 3/1977 | Adams et al. | 166/293 |
| 4,015,991 A | 4/1977 | Persinski et al. | 106/91 |
| 4,022,731 A | 5/1977 | Schmitt | 260/29.6 E |
| 4,107,057 A | 8/1978 | Dill et al. | 252/8.55 C |
| 4,149,900 A | 4/1979 | Childs et al. | 106/314 |
| 4,340,525 A | 7/1982 | Hubner et al. | 252/8.55 B |
| 4,367,093 A * | 1/1983 | Burkhalter et al. | 106/642 |
| 4,433,731 A | 2/1984 | Chatterji et al. | 166/293 |
| 4,435,216 A | 3/1984 | Diehl et al. | 106/97 |
| 4,466,837 A | 8/1984 | Chatterji et al. | 106/85 |
| 4,482,379 A | 11/1984 | Dibrell et al. | 106/76 |
| 4,515,635 A | 5/1985 | Rao et al. | 106/90 |
| 4,554,081 A | 11/1985 | Borchardt et al. | 252/8.5 A |
| 4,555,269 A | 11/1985 | Rao et al. | 106/90 |
| 4,557,763 A | 12/1985 | George et al. | 106/90 |
| 4,622,373 A | 11/1986 | Bardoliwalla | |
| 4,626,285 A * | 12/1986 | Peiffer et al. | 524/5 |
| 4,632,186 A | 12/1986 | Boncan et al. | 166/293 |
| 4,640,942 A | 2/1987 | Brothers | 523/130 |
| 4,657,948 A | 4/1987 | Nagaerkawa et al. | |
| 4,674,574 A | 6/1987 | Savoly et al. | |
| 4,676,317 A | 6/1987 | Fry et al. | 166/293 |
| 4,687,516 A | 8/1987 | Burkhalter et al. | 106/90 |
| 4,699,225 A | 10/1987 | Bardoliwalla | |
| 4,700,780 A | 10/1987 | Brothers | 166/293 |
| 4,703,801 A | 11/1987 | Fry et al. | 166/293 |
| 4,742,094 A | 5/1988 | Brothers et al. | 523/130 |
| 4,791,989 A | 12/1988 | Brothers et al. | 166/293 |
| 4,806,164 A | 2/1989 | Brothers | 106/90 |
| 4,818,288 A | 4/1989 | Aignesberger et al. | 106/90 |
| 4,883,125 A * | 11/1989 | Wilson et al. | 166/291 |
| 4,888,120 A | 12/1989 | Mueller et al. | 252/8.551 |
| 4,931,489 A | 6/1990 | Kucera et al. | 523/130 |
| 4,938,803 A | 7/1990 | Huddleston et al. | 106/719 |
| 4,941,536 A | 7/1990 | Brothers et al. | |
| 5,028,271 A | 7/1991 | Huddleston et al. | 106/720 |
| 5,028,341 A | 7/1991 | Laio | |
| 5,049,288 A | 9/1991 | Brothers et al. | |
| 5,076,852 A * | 12/1991 | Bloys et al. | 106/725 |
| 5,092,935 A * | 3/1992 | Crema et al. | 106/808 |
| 5,110,853 A | 5/1992 | Van-Det et al. | 524/375 |
| 5,116,421 A | 5/1992 | Ganguli | |
| 5,134,215 A | 7/1992 | Huddleston et al. | 527/400 |
| 5,147,964 A | 9/1992 | Huddleston et al. | 527/400 |
| 5,149,370 A | 9/1992 | Olaussen et al. | 106/737 |
| 5,151,131 A | 9/1992 | Burkhalter et al. | 106/822 |
| 5,181,568 A * | 1/1993 | McKown et al. | 166/293 |
| 5,339,903 A | 8/1994 | Eoff et al. | |
| 5,340,860 A | 8/1994 | Brake et al. | 524/166 |
| 5,355,955 A | 10/1994 | Rodrigues et al. | 166/293 |
| 5,383,967 A | 1/1995 | Chase | 106/737 |
| 5,411,092 A | 5/1995 | Cowan | 166/293 |
| 5,421,881 A | 6/1995 | Rodrigues et al. | 106/809 |
| 5,439,057 A | 8/1995 | Weaver et al. | 166/295 |
| 5,472,051 A | 12/1995 | Brothers | |
| 5,494,513 A | 2/1996 | Fu et al. | 106/672 |
| 5,536,311 A | 7/1996 | Rodrigues | |

(Continued)

FOREIGN PATENT DOCUMENTS

EP 0 157 055 A2 10/1985

(Continued)

OTHER PUBLICATIONS

Halliburton brochure entitled "Halad®-9 Fluid-Loss Additive" dated 1999.

(Continued)

*Primary Examiner*—Zakiya W. Bates
(74) *Attorney, Agent, or Firm*—Craig W. Roddy; Baker Botts L.L.P.

(57) ABSTRACT

Cement compositions comprising an improved fluid loss control additive, and methods for cementing using such cement compositions, are provided herein. Exemplary embodiments of the cement compositions comprise a hydraulic cement, water, and a fluid loss control additive comprising an acrylamide copolymer derivative, a dispersant, and a hydratable polymer. Optionally, other additives suitable for inclusion in cement compositions may be added.

122 Claims, No Drawings

U.S. PATENT DOCUMENTS

| | | | |
|---|---|---|---|
| 5,547,506 A | 8/1996 | Rae et al. | 106/730 |
| 5,558,161 A | 9/1996 | Vitthal et al. | 166/280 |
| 5,571,318 A | 11/1996 | Griffith et al. | |
| 5,588,489 A | 12/1996 | Chatterji et al. | 166/293 |
| 5,680,900 A | 10/1997 | Nguyen et al. | 166/295 |
| 5,749,418 A | 5/1998 | Mehta et al. | 166/292 |
| 5,866,517 A | 2/1999 | Carpenter et al. | 507/226 |
| 5,968,255 A | 10/1999 | Mehta et al. | 106/727 |
| 5,972,103 A | 10/1999 | Mehta et al. | 106/728 |
| 5,986,276 A | 11/1999 | Labriola, II | 250/515.1 |
| 5,988,279 A | 11/1999 | Udarbe et al. | 166/293 |
| 5,996,694 A | 12/1999 | Dewprashad et al. | 166/294 |
| 6,085,840 A | 7/2000 | Laramay et al. | 166/293 |
| 6,089,318 A | 7/2000 | Laramay et al. | 166/293 |
| 6,170,575 B1 | 1/2001 | Reddy et al. | 166/293 |
| 6,182,758 B1 | 2/2001 | Vijn | 166/293 |
| 6,196,317 B1 | 3/2001 | Hardy | 166/295 |
| 6,227,294 B1 | 5/2001 | Chatterji et al. | |
| 6,245,142 B1 | 6/2001 | Reddy et al. | 106/724 |
| 6,268,406 B1 | 7/2001 | Chatterji et al. | 523/130 |
| 6,372,037 B1 | 4/2002 | Lebo, Jr. et al. | |
| 6,379,456 B1 | 4/2002 | Heathman et al. | 106/724 |
| 6,405,801 B1 | 6/2002 | Vijn et al. | 166/293 |
| 6,457,524 B1 * | 10/2002 | Roddy | 166/293 |
| 6,465,587 B1 | 10/2002 | Bair et al. | 526/240 |
| 6,478,869 B1 | 11/2002 | Reddy et al. | 106/724 |
| 6,494,951 B1 | 12/2002 | Reddy et al. | 106/705 |
| 6,497,283 B1 | 12/2002 | Eoff et al. | 166/293 |
| 6,590,050 B1 | 7/2003 | Bair et al. | 526/240 |
| 6,689,208 B1 | 2/2004 | Brothers | |
| 6,715,552 B1 | 4/2004 | Eoff et al. | 166/293 |
| 6,739,806 B1 | 5/2004 | Szymanski et al. | 405/267 |
| 6,743,288 B1 | 6/2004 | Eoff et al. | |
| 6,767,867 B1 * | 7/2004 | Chatterji et al. | 507/216 |
| 6,939,536 B1 * | 9/2005 | Chen et al. | 424/70.1 |
| 2002/0134283 A1 | 9/2002 | Vijn et al. | |
| 2003/0008779 A1 | 1/2003 | Chen et al. | 507/200 |
| 2003/0083204 A1 | 5/2003 | Chatterji et al. | |
| 2004/0107877 A1 | 6/2004 | Getzlaf et al. | |
| 2004/0108113 A1 | 6/2004 | Luke et al. | |
| 2004/0112600 A1 | 6/2004 | Luke et al. | |

FOREIGN PATENT DOCUMENTS

| | | |
|---|---|---|
| EP | 0 444 489 A1 | 9/1991 |
| EP | 0444489 A1 * | 9/1991 |
| EP | 0538989 A2 | 4/1993 |
| EP | 0 973 698 | 10/1998 |
| EP | 1 051 368 | 7/1999 |
| EP | 1 153 898 A1 | 11/2001 |
| GB | 2 210 888 A | 6/1989 |
| WO | WO 00/41881 | 7/2000 |
| WO | WO 2005/003053 A1 | 1/2005 |

OTHER PUBLICATIONS

Halliburton brochure entitled "Halad®-14 Fluid-Loss Additive" dated 1999.

Halliburton brochure entitled "Halad®-22A Fluid-Loss Additive" dated 1998.

Halliburton brochure entitled "Halad®-23 Fluid-Loss Additive" dated 2000.

Halliburton brochure entitled "Halad®-322 Fluid-Loss Additive" dated 1999.

Halliburton brochure entitled Halad®-344 Fluid-Loss Additive dated 1998.

Halliburton brochure entitled "Halad®-413 Fluid-Loss Additive" dated 1999.

Halliburton brochure entitled "Halad®-447 Fluid-Loss Additive" dated 1999.

Halliburton brochure entitled "Halad®-567 Fluid-Loss Additive" dated 2000.

Halliburton brochure entitled "Halad®-600 E+ Fluid-Loss Additive" dated 1999.

Halliburton brochure entitled "Halad®-700 Fluid-Loss Additive" dated 2000.

Halliburton brochure entitled "Fluid Loss Additives, Our Case For Halliburton Additives is Water Tight" dated 1994.

SPE 10623 entitled "Acrylamide/Acrylic Acid Copolymers for Cement Fluid Loss Control" by Lee McKenzie et al., dated 1982.

Halliburton brochure "HR®-25 Cement Retarder" dated 1999.

Halliburton brochure entitled "Silicalite Cement Additive" dated 1999.

Written Opinion of the International Searching Authority of related counterpart application dated Oct. 1, 2004.

Halliburton brochure entitled "SCR-500L™ High-Temperature Retarder" dated 2000.

Halliburton brochure entitled "SCR-100 Cement Retarder" dated 1999.

Foreign communication from a related counterpart application dated Nov. 22, 2005.

Foreign communication from a related counterpart application dated Dec. 14, 2005.

* cited by examiner

CEMENT COMPOSITIONS WITH IMPROVED FLUID LOSS CHARACTERISTICS AND METHODS OF CEMENTING IN SURFACE AND SUBTERRANEAN APPLICATIONS

BACKGROUND OF THE INVENTION

1. Field of the Invention

The present invention relates to cementing operations, and more particularly, to cement compositions comprising an improved fluid loss control additive, and methods of using such compositions in surface and subterranean applications.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

In order for such well cementing operations to be successful, the cement compositions utilized must include a fluid loss control additive to reduce the loss of fluid, e.g., water, from the cement compositions when they contact permeable subterranean formations and zones. Excessive fluid loss, inter alia, causes a cement composition to be prematurely dehydrated, which limits the amount of cement composition that can be pumped, decreases the compressive strength of the cement composition, and prevents or reduces bond strength between the set cement composition and the subterranean zone, the walls of pipe, and/or the walls of the well bore. Fluid loss control agents may also be used in surface cement compositions.

Conventional contemporary synthetic fluid loss control additives are large, water-soluble polymers that are capable of functioning at a wider range of temperatures. An example of such synthetic fluid loss control additive is a fluid loss additive consisting of hydrolyzed copolymers of acrylamide ("AA") and 2-acrylamido, 2-methyl propane sulfonic acid ("AMPS"). However, certain of these AA/AMPS copolymers are useful only in operations where the bottom hole circulating temperature ("BHCT") ranges from about 90° F. to about 125° F., whereas BHCT ranges encountered in such operations are often outside such a range. Still further, certain of these copolymers have a salt tolerance of only up to about 10%.

The temperature limitations of certain of the AA/AMPS copolymers, e.g., ineffectiveness at temperatures above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between about 90° F. to about 100° F.) certain of the AA/AMPS copolymers are less effective as a fluid loss additive, requiring inclusion of larger amounts of such additive than at higher temperatures. The inclusion of a sufficiently large amount of a fluid loss control additive, to create a cement composition with acceptable fluid loss often creates viscosity and pumpability problems, since the addition of such copolymer directly affects the resultant slurry rheology. Certain copolymers of acrylamide and AMPS exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

SUMMARY OF THE INVENTION

The present invention relates to cementing operations, and more particularly, to cement compositions comprising an improved fluid loss control additive, and methods of using such compositions in surface and subterranean applications.

One method of the present invention comprises the steps of providing a cement composition comprising a hydraulic cement, water, and a fluid loss control additive comprising an acrylamide copolymer derivative, a dispersant, and a hydratable polymer; placing the cement composition into the subterranean formation; and permitting the cement composition to set therein.

One exemplary embodiment of the cement compositions of the present invention comprises a hydraulic cement, water, and a fluid loss control additive comprising an acrylamide copolymer derivative, a dispersant and a hydratable polymer. Optionally, other additives suitable for inclusion in cement compositions may be added.

The objects, features and advantages of the present invention will be readily apparent to those skilled in the art upon a reading of the description of the preferred embodiments, which follows.

DESCRIPTION OF PREFERRED EMBODIMENTS

The present invention relates to cementing operations, and more particularly, to cement compositions comprising an improved fluid loss control additive, and methods of using such compositions in surface and subterranean applications. While the compositions and methods of the present invention are useful in a variety of applications, they are particularly useful for subterranean well completion and remedial operations, such as primary cementing, e.g., cementing casings and liners in well bores, including those in production wells, which include multi-lateral subterranean wells. They are also useful for surface cementing operations, including construction cementing operations.

The cement compositions of the present invention generally comprise a cement, water sufficient to form a pumpable slurry, and a fluid loss control additive of the present invention. A wide variety of optional additives may be included, in the cement compositions of the present invention if desired. The cement compositions of the present invention may range in density from about 5 lb/gallon to about 30 lb/gallon. In one embodiment, the cement compositions of the present invention range in density from about 8 lb/gallon to about 20 lb/gallon.

Any cements suitable for use in subterranean applications are suitable for use in the present invention. Furthermore, any cements suitable for use in surface applications, e.g., construction cements, are suitable for use in the present invention. In one embodiment, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, and high alkalinity cements.

The water present in the cement compositions of the present invention may be from any source provided that it does not contain an excess of compounds that adversely affect other compounds in the cement compositions. For example, a cement composition of the present invention can comprise fresh water, salt water (e.g., water containing one or more salts dissolved therein), brine (e.g., saturated salt water), or seawater. The water may be present in an amount sufficient to form a pumpable slurry. Generally, the water is present in the cement compositions of the present invention in an amount in the range of from about 15% to about 200% by weight of cement ("bwoc") therein. In certain embodiments, the water is present in the cement compositions of the present invention in an amount in the range of from about 25% to about 60% bwoc therein.

The improved fluid loss control additives of the present invention generally comprise an acrylamide copolymer derivative, a hydratable polymer, and a dispersant. Certain embodiments comprise an acrylamide copolymer derivative and a hydratable polymer. Certain other embodiments comprise an acrylamide copolymer derivative and a dispersant. Optionally, other additives may be added, such as, for example, a zeolite, iron chloride, an organic acid, and the like.

The fluid loss additives of the present invention comprise an acrylamide copolymer derivative. As referred to herein, the term "copolymer" will be understood to mean a polymer comprising a plurality of compounds. For example, a "copolymer" may comprise, inter alia, a graft polymer wherein one monomer is grafted onto a backbone comprising another monomer. Any compound comprising 2-acrylamido-2-methylpropane sulfonic acid, or acid salts thereof, will be an "acrylamide copolymer derivative" as that term is used herein. An example of a suitable acrylamide copolymer derivative comprises a copolymer, or copolymer salt, of N,N-dimethylacrylamide and 2-acrylamido-2-methylpropane sulfonic acid, or acid salts thereof. Another example of a suitable acrylamide copolymer derivative comprises a graft polymer comprising a backbone comprising at least one member selected from the group consisting of lignin, lignite and their salts, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals. Another example of a suitable acrylamide copolymer derivative comprises a graft polymer comprising a backbone comprising at least one member selected from the group consisting of derivatized cellulose, polyvinyl alcohol, polyethylene oxide, polypropylene oxide, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals. Such examples of suitable acrylamide copolymer derivatives are described in U.S. Pat. Nos. 4,015,991; 4,515,635; 4,555,269; 4,676,317; 4,703,801; and 6,268,406, the relevant disclosures of which are incorporated herein by reference. An additional example of a suitable acrylamide copolymer derivative comprises copolymers or copolymer salts comprising 2-acrylamido-2-methylpropane sulfonic acid or acid salts thereof; for example, wherein the copolymers or copolymer salts comprise copolymers of hydrolyzed acrylamide and 2-acrylamido-2-methylpropane sulfonic acid derivatives. Examples of suitable commercially available acrylamide copolymer derivatives include, inter alia, those commercially available from Halliburton Energy Services, Inc., of Duncan, Okla., under the tradenames "HALAD®-344"; "HALAD®-413"; "HALAD®-4" and "HALAD®-700". In certain embodiments where the acrylamide copolymer derivative comprises a copolymer or copolymer salt of N,N-dimethylacrylamide and 2-acrylamido-2-methylpropane sulfonic acid or acid salts thereof, the copolymer, or copolymer salt, may have a N,N-dimethylacrylamide to 2-acrylamido-2-methylpropane sulfonic acid (or acid salts thereof) mole ratio of from about 1:4 to about 4:1. In certain embodiments, the copolymer, or copolymer salt, may have a weight average molecular weight of between about 75,000 and about 300,000 daltons. Generally, the acrylamide copolymer derivative is present in the fluid loss control additives of the present invention in an amount in the range of from about 1% to about 99% by weight. In one embodiment, the acrylamide copolymer derivative is present in the fluid loss control additive in an amount in the range of from about 30% to about 60% by weight.

Certain embodiments of the fluid loss control additive of the present invention comprise a dispersant. Where present, the dispersant in the fluid loss control additive acts, inter alia, to control the rheology of the cement composition and to stabilize the cement composition over a broad density range. While a variety of dispersants known to those skilled in the art may be used in accordance with the present invention, a preferred dispersant is a water-soluble polymer prepared by the caustic-catalyzed condensation of formaldehyde with acetone wherein the polymer contains sodium sulfate groups. Such a preferred dispersant is commercially available under the trade designation "CFR-3™" from Halliburton Energy Services, Inc., of Duncan, Okla. Another suitable dispersant is commercially available under the trade designation "CFR-2™," also from Halliburton Energy Services, Inc., of Duncan, Okla. Another source of a suitable dispersant is a multi-purpose cement additive commercially available under the trade designation "UNIVERSAL CEMENT SYSTEMS™" from Halliburton Energy Services, Inc., of Duncan, Okla.; such additive is disclosed in U.S. Pat. Nos. 5,749,418; 5,968,255; and 5,972,103, the relevant disclosures of which are herein incorporated by reference. Generally, the dispersant is present in the fluid loss control additive in an amount sufficient to prevent gelation of the cement composition. In some embodiments, the dispersant is present in the fluid loss control additive in an amount in the range of from about 25% to about 50% by weight. In one embodiment, the dispersant is present in the fluid loss control additive in an amount in the range of from about 30% to about 40% by weight.

Certain embodiments of the present invention comprise a hydratable polymer. Where present, the hydratable polymer in the fluid loss control additive acts, inter alia, to increase the viscosity of the cement composition in which the fluid loss control additive is used. Various hydratable polymers can be utilized in the fluid loss control additive including, but not limited to, carboxymethylcellulose, hydroxyethylcellulose, carboxymethylhydroxyethylcellulose, vinyl sulfonated polymers, and hydratable graft polymers. An example of a suitable hydratable polymer is a cellulose derivative commercially available from Dow Chemical Co., under the tradename "CARBOTRON 20." Another source of a suitable hydratable polymer is a multi-purpose cement additive commercially available under the trade designation "UNIVERSAL CEMENT SYSTEMS™" from Halliburton Energy Services, Inc., of Duncan, Okla.; such additive is disclosed in U.S. Pat. Nos. 5,749,418; 5,968,255; and 5,972,103, the relevant disclosures of which are herein incorporated by reference. Where utilized, the hydratable polymer is present in the fluid loss control additive in an amount sufficient to contribute a desired degree of viscosity to the cement composition. Generally, the hydratable polymer is present in the fluid loss control additive in an amount in the range of from about 0.1% to about 15% by weight. In one embodiment, the hydratable polymer is present in the fluid loss control additive in an amount in the range of from about 1.0% to about 5% by weight.

Optionally, the fluid loss control additives of the present invention may comprise a zeolite. Where used, the zeolite functions, inter alia, to improve the suspension of the fluid loss control additive in a cement slurry. The zeolite further comprises a mixture of chabazite and amorphous silica. The chabazite is present in the zeolite in an amount in the range of from about 50% by weight to about 75% by weight. In certain preferred embodiments, the chabazite is present in the zeolite in an amount in the range of from about 65% by weight to about 70% by weight. The amorphous silica is generally present in the zeolite in an amount in the range of from about 25% by weight to about 50% by weight. In certain preferred embodiments, the amorphous silica is present in the zeolite in an amount in the range of from about 30% by weight to about 35% by weight. An example of a suitable source of zeolite is available from the C2C Zeolite Corporation of Calgary, Canada. Where used, the zeolite is generally present in the fluid loss control additive in an amount in the range of from about 0. 1% by weight to about 15% by weight. In certain embodiments, the zeolite is present in the fluid loss control additive in an amount in the range of from about 3% by weight to about 7% by weight.

Optionally, in certain embodiments, the fluid loss control additives of the present invention may comprise iron chloride. Where used, the iron chloride may be ferrous chloride, ferric chloride, or mixtures thereof. The iron chloride functions, inter alia, in combination with other components which may be present, to aid the cement composition in hydrating in a predictable manner. Inter alia, the iron chloride component may also improve the compressive strength of the cement composition in which it is used. In one embodiment, the iron chloride used in the improved fluid loss control additives of the present invention is anhydrous ferric chloride. An example of a suitable source of anhydrous ferric chloride is commercially available from BASF Corporation in Germany. Where used, the iron chloride is present in the fluid loss control additive in an amount sufficient to allow the cement to be suitable for the subterranean environment of the well being cemented. More particularly, the iron chloride may be present in the fluid loss control additive in an amount in the range of from about 5% to about 25% by weight. In certain embodiments, the iron chloride may be present in the fluid loss control additive in an amount in the range of from about 10% to about 15% by weight.

In some embodiments, the fluid loss control additive may optionally comprise an organic acid. Where present, the organic acid acts, inter alia, to maintain the viscosity of the cement composition in which the fluid loss control additive is used over a broad density range by helping to prevent gelation of the cement composition. Various organic acids can be utilized in the fluid loss control additive including, but not limited to, tartaric acid, citric acid; gluconic acid, oleic acid, phosphoric acid, and uric acid. An example of a suitable organic acid is commercially available from Halliburton Energy Services, Inc., of Duncan, Okla., under the tradename "HR®-25." Other examples of suitable organic acids include, for example, organic acids which have either minimal or no effect on retarding or accelerating the setting of the cement. One of ordinary skill in the art with the benefit of this disclosure will recognize the types of organic acids which are appropriate for inclusion in the improved fluid loss control additives of the present invention. Where used, the organic acid is present in the fluid loss control additive in an amount sufficient to provide a desired degree of viscosity control. Generally, the organic acid is present in the fluid loss control additive in an amount in the range of from about 0.01% to about 5% by weight. In one embodiment, the organic acid is present in the fluid loss control additive in an amount in the range of from about 0.5% to about 2% by weight.

Optionally, the fluid loss control additive may contain a deaggregation agent. Where used, the deaggregation agent functions, inter alia, to improve the ability of the fluid loss control additive to flow freely as a powder. The deaggregation agent may also contribute a minor source of silica to the multi-purpose cement additive. An example of a suitable deaggregation agent is commercially available from National Pigment and Chemical Co. under the tradename Mica/Brite X150. Alternatively, quartz or ground sand may be used, though the spherical nature of Mica/Brite X150 particles is thought to contribute to improved flow characteristics for the cement composition. Generally, the deaggregation agent is present in the fluid loss control additive in an amount sufficient to enable the fluid loss control additive to flow freely as a powder. In some embodiments, the deaggregation agent is present in the fluid loss control additive in an amount in the range of from about 1% to about 15% by weight. In one embodiment, the deaggregation agent is present in the fluid loss control additive in an amount in the range of from about 5% to about 10% by weight.

Optionally, the fluid loss control additive may comprise a source of silica. Where present in the fluid loss control additive, the silica assists in maintaining the compressive strength of the cement composition after setting. An example of a suitable source of high surface area amorphous silica is commercially available from Halliburton Energy Services, Inc., of Duncan, Okla., under the tradename "SILICALITE." Where used, the high surface area amorphous silica is present in the fluid loss control additive in an amount sufficient to provide a desired after-set compressive strength. More particularly, the high surface area amorphous silica is present in the fluid loss control additive in an amount in the range of from about 0.1% to about 15% by weight. In one embodiment, the high surface area amorphous silica is present in the fluid loss control additive in an amount in the range of from about 1% to about 5% by weight.

The improved fluid loss control additives of the present invention may be prepared in a variety of forms, including, inter alia, particulates, solutions, suspensions. Generally, the fluid loss control additives of the present invention are present in the cement compositions of the present invention in an amount sufficient to provide a desired level of fluid loss control. More particularly, the fluid loss control additive may be present in the cement composition in an amount in the range of from about 0.01% to about 10% bwoc. In certain preferred embodiments, the fluid loss control additive is present in the cement composition in an amount in the range of from about 0.25% to about 1.5% bwoc.

As will be recognized by those skilled in the art, the cement compositions of this invention also can include additional suitable additives, including, inter alia, accelerants, set retarders, defoamers, microspheres, fiber, weighting materials, salts, vitrified shale, fly ash and the like. Any suitable additive may be incorporated within the cement compositions of the present invention. One of ordinary skill in the art with the benefit of this disclosure will be able to recognize where a particular additive is suitable for a particular application.

An exemplary embodiment of a cement composition of the present invention comprises Class H Portland cement, 45% water bwoc, and 0.7% fluid loss control additive of the present invention bwoc. An exemplary embodiment of a fluid loss control additive of the present invention comprises 63.1% acrylamide copolymer derivative, and 36.9% dispersant. Another exemplary embodiment of a fluid loss control additive of the present invention comprises 95.7% acrylamide copolymer derivative, and 4.3% hydratable polymer.

A method of the present invention comprises providing a cement composition that comprises a cement, water sufficient to form a pumpable slurry, and a fluid loss control additive of the present invention; placing this cement composition in a subterranean formation; and permitting the cement composition to set therein.

To facilitate a better understanding of the present invention, the following illustrative examples of some of the preferred exemplary embodiments are given. In no way should such examples be read to limit the scope of the invention.

EXAMPLE 1

Sample compositions were prepared by mixing a cement slurry with a fluid loss additive according to the following procedure. Each sample was dry blended, then mixed for 35 seconds at 13,000 rpm in a blender. Next, the sample was conditioned for 20 minutes at 125° F. in an atmospheric consistometer. After the sample was poured into a preheated cell with a 325 mesh screen, a fluid loss test was performed for 30 minutes at 1,000 psi and 125° F., in accordance with API RP 10B, Recommended Practices for Testing Well Cements.

Sample Composition No. 1 comprises a 15.6 lb/gallon ("ppg") slurry of Texas Lehigh Class A cement, with no fluid loss additives. The fluid loss was found to be 1,574 cubic centimeters.

Sample Composition No. 2 was prepared by mixing 0.5% of Universal Cement Systems™ multi-purpose cement additive by weight of cement with a 15.6 ppg slurry of Texas Lehigh Class A cement. The fluid loss was found to be 1,175 cubic centimeters.

Sample Composition No. 3 was prepared by mixing 0.35% of an acrylamide copolymer derivative (HALAD®-344) by weight of cement with a 15.8 ppg slurry of an experimental cement bearing compositional similarities to a Class H cement. The fluid loss was found to be 270 cubic centimeters.

Sample Composition No. 4 was prepared by mixing 0.7% of a fluid loss control additive with a 15.8 ppg slurry of an experimental cement bearing compositional similarities to a Class H cement. The fluid loss control additive comprised a 1:1 mixture of an acrylamide copolymer derivative (HALAD®-344) and Universal Cement Systems™ multi-purpose cement additive. Accordingly, Sample Composition No. 4 contained 0.35% HALAD®-344 by weight of cement and 0.35% Universal Cement Systems™ multi-purpose cement additive by weight of cement. The fluid loss was found to be 112 cubic centimeters.

Sample Composition No. 5 was prepared by mixing 0.5% of an acrylamide copolymer derivative (HALAD®-344) by weight of cement with a 15.8 ppg slurry of an experimental cement bearing compositional similarities to a Class H cement. The fluid loss was found to be 80 cubic centimeters.

A summary of the fluid loss demonstrated by each of the samples is depicted in Table 1, below.

TABLE 1

| FLUID | % Universal Cement Systems ™ | % HALAD ®-344 | FLUID LOSS (cc) |
| --- | --- | --- | --- |
| Sample Composition No. 1 | 0 | 0 | 1,574 |
| Sample Composition No. 2 | 0.5 | 0 | 1,175 |
| Sample Composition No. 3 | 0 | 0.35 | 270 |
| Sample Composition No. 4 | 0.35 | 0.35 | 112 |
| Sample Composition No. 5 | 0 | 0.5 | 80 |

Thus, Example 1 demonstrates, inter alia, that the use of a fluid loss control additive comprising a reduced dose of an acrylamide copolymer derivative delivers performance comparable to a larger dose of an acrylamide copolymer derivative.

EXAMPLE 2

Sample Composition No. 4 was then permitted to age for a period of two days, and a period of ten days. After each time period had elapsed, a fluid loss test was again performed for 30 minutes at 1,000 psi and 125° F. After aging for a total of two days, Sample Composition No. 4 demonstrated a fluid loss of 84 cubic centimeters. After aging for a total of ten days, Sample Composition No. 4 demonstrated a fluid loss of 76 cubic centimeters. This Example demonstrates, inter alia, that the use of a fluid loss control additive comprising a reduced dose of acrylamide copolymer derivative, can deliver performance equal to or superior to a larger dose of acrylamide copolymer derivative.

EXAMPLE 3

Sample compositions were prepared by mixing a cement slurry with a fluid loss additive according to the following procedure. Each sample was dry blended, then mixed for 35 seconds at 13,000 rpm in a blender. Next, the sample was conditioned for 20 minutes at 125° F. in an atmospheric consistometer. After the sample was poured into a preheated cell with a 325 mesh screen, a fluid loss test was performed for 30 minutes at 1,000 psi and 125° F., in accordance with API RP 10B, Recommended Practices for Testing Well Cements.

Sample Composition No. 6 was prepared by mixing 0.5% of an acrylamide copolymer derivative (HALAD®-413) by weight of cement with a 15.8 ppg slurry of an experimental cement bearing compositional similarities to a Class H cement. The fluid loss was found to be 615 cubic centimeters.

Sample Composition No. 7 was prepared by mixing a 15.8 ppg slurry of an experimental cement bearing compositional similarities to a Class. H cement with 1.0% of a fluid loss additive comprising a 1:1 mixture of Universal Cement Systems™ multi-purpose cement additive with an acrylamide copolymer derivative (HALAD®-413); accordingly, Sample Composition No. 7 contained 0.5% HALAD®-413 by weight of cement and 0.5% Universal Cement Systems™ multi-purpose cement additive by weight of cement. The fluid loss was found to be 212 cubic centimeters.

Sample Composition No. 8 was prepared by mixing 0.7% of an acrylamide copolymer derivative (HALAD®-413) by weight of cement with a 15.8 ppg slurry of an experimental cement bearing compositional similarities to a Class H cement. The fluid loss was found to be 188 cubic centimeters.

Sample Composition No. 9 was prepared by mixing 0.5% of an acrylamide copolymer derivative (HALAD®-4) by weight of cement with a 15.8 ppg slurry of an experimental cement bearing compositional similarities to a Class H cement. The fluid loss was found to be 196 cubic centimeters.

Sample Composition No. 10 was prepared by mixing a 15.8 ppg slurry of an experimental cement bearing compositional similarities to a Class H cement with 1.0% of a fluid loss control additive comprising a 1:1 mixture of Universal Cement Systems™ multi-purpose cement additive and an acrylamide copolymer derivative (HALAD®-4); accordingly, Sample Composition No. 10 contained 0.5% HALAD®-4 by weight of cement and 0.5% Universal Cement Systems™ multi-purpose cement additive by weight of cement. The fluid loss was found to be 100 cubic centimeters.

Sample Composition No. 11 was prepared by mixing 0.7% of an acrylamide copolymer derivative (HALAD®-4) by weight of cement with a 15.8 ppg slurry of an experimental cement bearing compositional similarities to a Class H cement. The fluid loss was found to be 64 cubic centimeters.

A summary of the fluid loss demonstrated by each of the samples is depicted in Table 2, below.

TABLE 2

| FLUID | % Universal Cement Systems ™ | % HALAD ®- 413 | % HALAD ®- 4 | FLUID LOSS (cc) |
|---|---|---|---|---|
| Sample Composition No. 6 | 0 | 0.5 | 0 | 615 |
| Sample Composition No. 7 | 0.5 | 0.5 | 0 | 212 |
| Sample Composition No. 8 | 0 | 0.7 | 0 | 188 |
| Sample Composition No. 9 | 0 | 0 | 0.5 | 196 |
| Sample Composition No. 10 | 0.5 | 0 | 0.5 | 100 |
| Sample Composition No. 11 | 0 | 0 | 0.7 | 64 |

Universal Cement Systems™ multi-purpose cement additive comprises a hydratable polymer and a dispersant. Example 3 demonstrates, inter alia, that the use of an improved fluid loss control additive comprising a hydratable polymer, a dispersant, and a reduced dose of an acrylamide copolymer derivative provides comparable fluid loss control to a fluid loss control additive comprising a larger dose of an acrylamide copolymer derivative. Inter alia, Example 3 also demonstrates that a variety of acrylamide copolymer derivatives are suitable for combination with, inter alia, a hydratable polymer and a dispersant, in the fluid loss control additives of the present invention.

EXAMPLE 4

Sample compositions were prepared by mixing a cement slurry with a fluid loss additive according to the following procedure. Each sample was dry blended, then mixed for 35 seconds at 13,000 rpm in a blender. Next, the sample was conditioned for 20 minutes at 190° F. in an atmospheric consistometer. After the sample was poured into a preheated cell with a 325 mesh screen, a fluid loss test was performed per API Specification 10.7 for 30 minutes at 1,000 psi and 205° F.

Sample Composition No. 12 was prepared by mixing 0.49% of an acrylamide copolymer derivative (HALAD®-344) by weight of cement with a 15.8 ppg slurry of an experimental cement bearing compositional similarities to a Class H cement. The fluid loss at 1,000 psi and 205° F. was found to be 220 cubic centimeters.

Sample Composition No. 13 was prepared by mixing 0.98% of a fluid loss control additive of the present invention with a 15.8 ppg slurry of an experimental cement bearing compositional similarities to a Class H cement. The fluid loss control additive comprised a 1:1 mixture of Universal Cement Systems™ multi-purpose cement additive and an acrylamide copolymer derivative (HALAD®-344); accordingly, Sample Composition No. 13 contained 0.49% HALAD®-344 by weight of cement and 0.49% Universal Cement Systems™ multi-purpose cement additive by weight of cement. The fluid loss at 1,000 psi and 205° F. was found to be 60 cubic centimeters.

Sample Composition No. 14 was prepared by mixing 0.7% of an acrylamide-copolymer derivative (HALAD®-344) by weight of cement with a 15.8 ppg slurry of an experimental cement bearing compositional similarities to a Class H cement. The fluid loss at 1,000 psi and 205° F. was found to be 44 cubic centimeters.

A summary of the fluid loss demonstrated by each of the samples is depicted in Table 3, below.

TABLE 3

| FLUID | % Universal Cement Systems ™ | % HALAD ®- 344 | FLUID LOSS (cc) |
|---|---|---|---|
| Sample Composition No. 12 | 0 | 0.49 | 220 |
| Sample Composition No. 13 | 0.49 | 0.49 | 60 |
| Sample Composition No. 14 | 0 | 0.7 | 44 |

Thus, Example 4 demonstrates, inter alia, that the use of a fluid loss control additive comprising a reduced dose of an acrylamide copolymer derivative delivers performance comparable to a larger dose of an acrylamide copolymer derivative. Additionally, Example 4 demonstrates that such fluid loss control additive is an effective fluid loss control additive at elevated temperatures and pressures.

EXAMPLE 5

A sample composition was prepared by mixing a cement slurry with a fluid loss additive according to the following procedure. The sample was dry blended, then mixed for 35 seconds at 13,000 rpm in a blender. Next, the sample was conditioned for 60 minutes at 400° F. in a stirring fluid loss cell. After the sample was poured into a preheated cell with a 325 mesh screen, a fluid loss test was performed for 30 minutes at 1,000 psi and 400° F.

Sample Composition No. 15 was prepared by mixing 0.84% of a fluid loss control additive of the present invention with a 15.6 ppg slurry comprising 30% "SSA-1" bwoc, and the balance comprising an experimental cement bearing compositional similarities to a Class H cement. SSA-1 is a silica flour additive available from Halliburton Energy Services, Inc., of Houston, Tex. The fluid loss control additive comprised a 1:1 mixture of Universal Cement Systems™ multi-purpose cement additive and an acrylamide copolymer derivative (HALAD®-344); accordingly, Sample Composition No. 15 contained 0.42% HALAD®-344 by weight of cement and 0.42% Universal Cement Systems™ multi-purpose cement additive by weight of cement. The fluid loss at 1,000 psi and 405° F. was found to be 400 cubic centimeters.

Inter alia, Example 5 demonstrates that the fluid loss control additive of the present invention provides fluid loss control at elevated temperatures.

EXAMPLE 6

The transition time of a cement composition may be defined as the time period starting when the cement composition has sufficient gel strength to support itself yet cannot prevent influx of formation fluids, and ending when the cement composition achieves sufficient gel strength to prevent the influx of such formation fluids. Experimentally, the transition time may be approximated by measuring the time period in which the gel strength of a cement composition progresses from about 100 lb per 100 ft$^2$ to about 500 lb per 100 ft$^2$.

The zero-gel time, which may also be referred to as the delayed-gel time, refers to the time period starting when the cement composition is placed in a subterranean formation and ending when the gel strength of the cement composition progresses to about 100 lb per 100 ft$^2$, i.e., ending when the cement composition begins its transition time.

Sample compositions were prepared by mixing a cement slurry with a fluid loss additive according to the following procedure. Each sample was dry blended, then mixed for 35 seconds at 13,000 rpm in a blender. Next, the sample was conditioned for 40 minutes to 125° F. in a MiniMac® at 5,000 psi. Then, a static gel strength test was performed.

Sample Composition No. 16 was prepared by mixing 0.7% of an acrylamide copolymer derivative (HALAD®-344) by weight of cement with a 15.8 ppg slurry of an experimental cement bearing compositional similarities to a Class H cement. Sample Composition No. 16 demonstrated a zero gel time of 41 minutes, and a transition time of 17 minutes.

Sample Composition No. 17 was prepared by mixing 1.0% of a fluid loss control additive of the present invention with a 15.8 ppg slurry of an experimental cement bearing compositional similarities to a Class H cement. The fluid loss control additive comprised a 1:1 mixture of Universal Cement Systems™ multi-purpose cement additive and an acrylamide copolymer derivative (HALAD®-344); accordingly, Sample Composition No. 17 contained 0.5% HALAD®-344 by weight of cement and 0.5% Universal Cement Systems™ multi-purpose cement additive by weight of cement. Sample Composition No. 17 demonstrated a zero gel time of 1 hour 16 minutes and a transition time of 17 minutes.

A summary of the data from each of the samples is depicted in Table 4, below.

TABLE 4

| FLUID | % Universal Cement Systems ™ | % HALAD ®- 344 | Zero Gel Time (hours:minutes) | Transition Time (minutes) |
|---|---|---|---|---|
| Sample Composition No. 16 | 0 | 0.7 | 0:41 | 17 |
| Sample Composition No. 17 | 0.5 | 0.5 | 1:16 | 17 |

Thus, Example 6 demonstrates, inter alia, that the use of a fluid loss control additive comprising a reduced dose of an acrylamide copolymer derivative delivers performance comparable to a larger dose of the acrylamide copolymer derivative.

EXAMPLE 7

Sample compositions were prepared by mixing a cement slurry with a fluid loss additive according to the following procedure. Each sample was dry blended, then mixed for 35 seconds at 13,000 rpm in a blender. Next, the sample was conditioned for 20 minutes at 125° F. in an atmospheric consistometer. After the sample was poured into a preheated cell with a 325 mesh screen, a fluid loss test was performed for 30 minutes at 1,000 psi and 125° F., in accordance with API RP 10B, Recommended Practices for Testing Well Cements.

Sample Composition No. 18 was prepared by mixing 0.7% of a fluid loss additive by weight of cement with a 15.8 ppg slurry of an experimental cement bearing compositional similarities to a Class H cement. The fluid loss additive comprised a 1:1 mixture of Universal Cement Systems™ multi-purpose cement additive with an acrylamide copolymer derivative (HALAD®-344); accordingly, Sample Composition No. 18 contained 0.35% HALAD®-344 by weight of cement and 0.35% Universal Cement Systems™ multi-purpose cement additive by weight of cement. The fluid loss was found to be 80 cubic centimeters.

Sample Composition No. 19 was prepared by mixing a 15.8 ppg slurry of an experimental cement bearing compositional similarities to a Class H cement with 0.7% of a fluid loss additive comprising 47.5% of an acrylamide copolymer derivative (HALAD®-344) by weight, 47.5% Universal Cement Systems™ multi-purpose cement additive by weight, and 5% zeolite by weight. Accordingly, Sample Composition No. 19 contained 0.3325% HALAD®-344 by weight of cement, 0.3325% Universal Cement Systems™ multi-purpose cement additive by weight of cement, and 0.035% zeolite by weight of cement. The fluid loss was found to be 96 cubic centimeters.

Thus, Example 7, demonstrates, inter alia, that the use of a fluid loss control additive of the present invention provides acceptable fluid loss control.

EXAMPLE 8

Sample compositions were prepared by mixing a cement slurry with a fluid loss additive according to the following procedure. Each sample was dry blended, then mixed for 35 seconds at 13,000 rpm in a blender. Next, the sample was conditioned for 20 minutes at 125° F. in an atmospheric consistometer. After the sample was poured into a preheated cell with a 325 mesh screen, a fluid loss test was performed for 30 minutes at 1,000 psi and 125° F., in accordance with API RP 10B, Recommended Practices for Testing Well Cements.

Sample Composition No. 20 comprises a 15.8 ppg slurry of TXI Class H cement, with no fluid loss control additives. The fluid loss was found to be 1,529 cubic centimeters.

Sample Composition No. 21 was prepared by mixing 0.35% of Universal Cement Systems™ multi-purpose cement additive by weight of cement with a 15.8 ppg slurry of TXI Class H cement. The fluid loss was found to be 1,343 cubic centimeters.

Sample Composition No. 22 was prepared by mixing 0.35% of an acrylamide copolymer derivative (HALAD®-344) by weight of cement with a 15.8 ppg slurry of TXI Class H cement. The fluid loss was found to be 64 cubic centimeters.

Sample Composition No. 23 was prepared by mixing 0.35% of an, acrylamide copolymer derivative (HALAD®-344) by weight of cement and 0.0157% of a hydrated polymer (CARBOTRON 20) by weight of cement with a 15.8 ppg slurry of TXI Class H cement. The fluid loss was found to be 60 cubic centimeters.

Sample Composition No. 24 was prepared by mixing 0.35% of an acrylamide copolymer derivative (HALAD®-344) by weight of cement, 0.0157% of a hydrated polymer (CARBOTRON 20) by weight of cement, and 0.204% of a dispersant (CFR-3) by weight of cement, with a 15.8 ppg slurry of TXI Class H cement. The fluid loss was found to be 44 cubic centimeters.

Sample Composition No. 25 was prepared by mixing a 15.8 ppg slurry of TXI Class H cement with 0.7% of a fluid loss additive comprising 47.5% of an acrylamide copolymer derivative (HALAD®-344) by weight, 47.5% Universal Cement Systems™ multi-purpose cement additive by weight, and 5% zeolite by weight. Accordingly, Sample Composition No. 25 contained 0.3325% HALAD®-344 by weight of cement, 0.3325% Universal Cement Systems™ multi-purpose cement additive by weight of cement, and 0.035% zeolite by weight of cement. The fluid loss was found to be 44 cubic centimeters.

Sample Composition No. 26 was prepared by mixing 0.35% of an acrylamide copolymer derivative (HALAD®-344) by weight of cement and 0.204% of a dispersant (CFR-3) by weight of cement, with a 15.8 ppg slurry of TXI Class H cement. The fluid loss was found to be 48 cubic centimeters.

A summary of the data from each of the samples is depicted in Table 5, below.

TABLE 5

| FLUID | % Universal Cement Systems ™ | % HALAD ® -344 | % Zeolite | % CARBOTRON 20 | % CFR-3 | FLUID LOSS (cc) |
|---|---|---|---|---|---|---|
| Sample Composition No. 20 | 0 | 0 | 0 | 0 | 0 | 1,529 |
| Sample Composition No. 21 | 0.35 | 0 | 0 | 0 | 0 | 1,343 |
| Sample Composition No. 22 | 0 | 0.35 | 0 | 0 | 0 | 64 |
| Sample Composition No. 23 | 0 | 0.35 | 0 | 0.0157 | 0 | 60 |
| Sample Composition No. 24 | 0 | 0.35 | 0 | 0.0157 | 0.204 | 44 |
| Sample Composition No. 25 | 0.3325 | 0.33250 | 0.035 | 0 | 0 | 44 |
| Sample Composition No. 26 | 0 | 0.35 | 0 | 0 | 0.204 | 48 |

Inter alia, Example 8 demonstrates that the addition of, inter alia, a zeolite, a hydratable polymer, and a dispersant, to an acrylamide copolymer derivative provide improved fluid loss control.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation comprising the steps of: providing a cement composition comprising a hydraulic cement, water, and a fluid loss control additive, the fluid loss control additive comprising: an acrylamide copolymer derivative; an iron compound; and a hydratable polymer; placing the cement composition into the subterranean formation; and permitting the cement composition to set therein.

2. The method of claim 1 wherein the acrylamide copolymer derivative comprises a copolymer or copolymer salt of N,N-dimethylacrylamide and 2-acrylamido-2-methylpropane sulfonic acid or acid salts thereof.

3. The method of claim 2 wherein the copolymer or copolymer salt has a N,N-dimethylacrylamide to 2-acrylamido-2-methylpropane sulfonic acid (or acid salts thereof) mole ratio of from about 1:4 to about 4:1.

4. The method of claim 2 wherein the copolymer or copolymer salt has a weight average molecular weight of between about 75,000 and about 300,000 daltons.

5. The method of claim 1 wherein the acrylamide copolymer derivative comprises copolymers or copolymer salts comprising 2-acrylamido-2-methylpropane sulfonic acid or acid salts thereof.

6. The method of claim 5 wherein the copolymers or copolymer salts comprise copolymers of hydrolyzed acrylamide and 2-acrylamido-2-methylpropane sulfonic acid derivatives.

7. The method of claim 1 wherein the hydratable polymer comprises carboxymethylcellulose, hydroxyethylcellulose, carboxymethylhydroxyethylcellulose, vinyl sulfonated polymers, hydratable graft polymers, and mixtures thereof.

8. The method of claim 1 wherein the fluid loss control additive further comprises a dispersant.

9. The method of claim 8 wherein the dispersant comprises a water-soluble polymer prepared by the caustic-catalyzed condensation of formaldehyde with acetone wherein the polymer contains sodium sulfate groups.

10. The method of claim 8 wherein the dispersant is present in the fluid loss control additive in an amount sufficient to prevent gelation of the cement composition.

11. The method of claim 8 wherein the dispersant is present in the fluid loss control additive in an amount in the range of from about 25% to about 50% by weight of the fluid loss control additive.

12. The method of claim 1 wherein the cement comprises Portland cements, pozzolanic cements, gypsum cements, high alumina content cements, silica cements, or high alkalinity cements.

13. The method of claim 1 wherein the water is present in the cement composition in an amount sufficient to form a pumpable slurry.

14. The method of claim 1 wherein the water is present in the cement composition in an amount in the range of from about 15% to about 200% by weight of cement.

15. The method of claim 1 wherein the cement composition has a density in the range of from about 5 pounds per gallon to about 30 pounds per gallon.

16. The method of claim 1 wherein the cement composition further comprises a weighting agent, a defoamer, a surfactant, mica, fiber, bentonite, microspheres, fumed silica, a salt, vitrified shale, fly ash, a dispersant, a retardant or an accelerant.

17. The method of claim 1 wherein the fluid loss control additive is present in the cement composition in an amount sufficient to provide a desired degree of fluid loss control.

18. The method of claim 1 wherein the fluid loss control additive is present in the cement composition in an amount in the range of from about 0.01% by weight of cement to about 5.0% by weight of cement.

19. The method of claim 1 wherein the hydratable polymer is present in the fluid loss control additive in an amount in the range of from about 0.1% to about 15% by weight of the fluid loss control additive.

20. The method of claim 1 wherein the acrylamide copolymer derivative is present in the fluid loss control additive in an amount in the range of from about 1% to about 99% by weight.

21. A method of cementing in a subterranean formation comprising the steps of: providing a cement composition comprising a hydraulic cement, water, and a fluid loss control additive, the fluid loss control additive comprising: an acrylamide copolymer derivative; an iron compound; and a hydratable polymer; placing the cement composition into the subterranean formation; and permitting the cement composition to set therein; wherein the acrylamide copolymer derivative comprises a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

22. A method of cementing in a subterranean formation comprising the steps of: providing a cement composition comprising a hydraulic cement, water, and a fluid loss control additive, the fluid loss control additive comprising: an acrylamide copolymer derivative; an iron compound; and a hydratable polymer; placing the cement composition into the subterranean formation; and permitting the cement composition to set therein; wherein the acrylamide copolymer derivative comprises a graft polymer comprising a backbone comprising at least one member selected from the group consisting of derivatized cellulose, polyvinyl alcohol, polyethylene oxide, polypropylene oxide, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

23. A method of cementing in a subterranean formation comprising the steps of: providing a cement composition comprising a hydraulic cement, water, and a fluid loss control additive, the fluid loss control additive comprising: an acrylamide copolymer derivative, a hydratable polymer, an iron compound, and a zeolite; placing the cement composition into the subterranean formation; and permitting the cement composition to set therein.

24. The method of claim 23 wherein the fluid loss control additive further comprises a dispersant.

25. The method of claim 24 wherein the fluid loss control additive comprises iron chloride, an organic acid, a deaggregation agent, silica, or mixtures thereof.

26. The method of claim 25 wherein the iron chloride is present in the fluid loss control additive in an amount sufficient to allow the cement to be suitable for the subterranean temperature of the well being cemented.

27. The method of claim 25 wherein the iron chloride is present in the fluid loss control additive in an amount in the range of from about 5% to about 25% by weight of the fluid loss control additive.

28. The method of claim 25 wherein the iron chloride is anhydrous ferric chloride.

29. The method of claim 25 wherein the organic acid is present in the fluid loss control additive in an amount sufficient to provide a desired degree of viscosity control.

30. The method of claim 25 wherein the organic acid is present in the fluid loss control additive in an amount in the range of from about 0.01% to about 5% by weight of the fluid loss control additive.

31. The method of claim 25 wherein the silica is high surface area amorphous silica.

32. The method of claim 31 wherein the high surface area amorphous silica is present in the fluid loss control additive in an amount sufficient to provide a desired after-set compressive strength.

33. The method of claim 31 wherein the high surface area amorphous silica is present in the fluid loss control additive in an amount in the range of from about 0.1% to about 15% by weight of the fluid loss control additive.

34. The method of claim 25 wherein the de-aggregation agent is present in the fluid loss control additive in an amount sufficient to enable the fluid loss control additive to flow freely as a powder.

35. The method of claim 34 wherein the de-aggregation agent is present in the fluid loss control additive in an amount in the range of from about 1% to about 15% by weight of the fluid loss control additive.

36. The method of claim 24 wherein the fluid loss control additive is present in the cement composition in an amount in the range of from about 0.25% to about 1.5% by weight of the cement; wherein the hydratable polymer is present in the fluid loss control additive in an amount in the range of from about 1.5% to about 4.5% by weight; wherein the acrylamide copolymer derivative is present in the fluid loss control additive in an amount in the range of from about 40% by weight to about 50% by weight; wherein the dispersant is present in the fluid loss control additive in an amount in the range of from about in the range of from about 40% to about 60% by weight; wherein the zeolite is present in the fluid loss control additive in an amount in the range of from about 1% by weight to about 10% by weight.

37. The method of claim 23 wherein the zeolite further comprises chabazite and amorphous silica.

38. The method of claim 23 wherein the zeolite is present in the fluid loss control additive in an amount in the range of from about 0.1% to about 15% by weight of the fluid loss control additive.

39. A method of cementing in a subterranean formation comprising the steps of:
providing a cement composition comprising a hydraulic cement, water, and a fluid loss control additive, the fluid loss control additive comprising: an acrylamide copolymer derivative; an iron compound; and a dispersant;
placing the cement composition into the subterranean formation; and
permitting the cement composition to set therein.

40. The method of claim 39 wherein the acrylamide copolymer derivative comprises a copolymer or copolymer salt of N,N-dimethylacrylamide and 2-acrylamido-2-methylpropane sulfonic acid or acid salts thereof.

41. The method of claim 39 wherein the acrylamide copolymer derivative comprises copolymers or copolymer salts comprising 2-acrylamido-2-methylpropane sulfonic acid or acid salts thereof.

42. The method of claim 41 wherein the copolymers or copolymer salts comprise copolymers of hydrolyzed acrylamide and 2-acrylamido-2-methylpropane sulfonic acid derivatives.

43. The method of claim 39 wherein the dispersant comprises a water-soluble polymer prepared by the caustic-catalyzed condensation of formaldehyde with acetone wherein the polymer contains sodium sulfate groups.

44. A method of cementing in a subterranean formation comprising the steps of: providing a cement composition comprising a hydraulic cement, water, and a fluid loss control additive, the fluid loss control additive comprising: an acrylamide copolymer derivative; an iron compound; and a dispersant; placing the cement composition into the subterranean formation; and permitting the cement composition to set therein; wherein the acrylamide copolymer derivative comprises a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

45. A method of cementing in a subterranean formation comprising the steps of: providing a cement composition comprising a hydraulic cement, water, and a fluid loss control additive, the fluid loss control additive comprising: an acrylamide copolymer derivative; an iron compound; and a dispersant; placing the cement composition into the subterranean formation; and permitting the cement composition to set therein; wherein the acrylamide copolymer derivative comprises a graft polymer comprising a backbone comprising at least one member selected from the group consisting of derivatized cellulose, polyvinyl alcohol, polyethylene oxide, polypropylene oxide, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

46. A method of cementing in a subterranean formation comprising the steps of: providing a cement composition comprising a hydraulic cement, water, and a fluid loss control additive, the fluid loss control additive comprising: an acrylamide copolymer derivative, an iron compound, a hydratable polymer, a zeolite, and a dispersant; placing the cement composition into the subterranean formation; and permitting the cement composition to set therein.

47. The method of claim 46 wherein the dispersant comprises a water-soluble polymer prepared by the caustic-catalyzed condensation of formaldehyde with acetone wherein the polymer contains sodium sulfate groups.

48. A method of reducing the fluid loss from a cement composition, comprising the step of adding to the cement composition a fluid loss control additive comprising: an acrylamide copolymer derivative; an iron compound; and a hydratable polymer.

49. The method of claim 48 wherein the acrylamide copolymer derivative comprises a copolymer or copolymer salt of N,N-dimethylacrylamide and 2-acrylamido-2-methylpropane sulfonic acid or acid salts thereof.

50. The method of claim 49 wherein the copolymer or copolymer salt has a N,N-dimethylacrylamide to 2-acrylamido-2-methylpropane sulfonic acid (or acid salts thereof) mole ratio of from about 1:4 to about 4:1.

51. The method of claim 49 wherein the copolymer or copolymer salt has a weight average molecular weight of between about 75,000 and about 300,000 daltons.

52. The method of claim 48 wherein the acrylamide copolymer derivative comprises copolymers or copolymer salts comprising 2-acrylamido-2-methylpropane sulfonic acid or acid salts thereof.

53. The method of claim 52 wherein the copolymers or copolymer salts comprise copolymers of hydrolyzed acrylamide and 2-acrylamido-2-methylpropane sulfonic acid derivatives.

54. The method of claim 48 wherein the hydratable polymer comprises carboxymethylcellulose, hydroxyethylcellulose, carboxymethylhydroxyethylcellulose, vinyl sulfonated polymers, hydratable graft polymers, and mixtures thereof.

55. The method of claim 48 wherein the fluid loss control additive further comprises a dispersant.

56. The method of claim 55 wherein the dispersant comprises a water-soluble polymer prepared by the caustic-catalyzed condensation of formaldehyde with acetone wherein the polymer contains sodium sulfate groups.

57. The method of claim 55 wherein the dispersant is present in the fluid loss control additive in an amount sufficient to prevent gelation of the cement composition.

58. The method of claim 55 wherein the dispersant is present in the fluid loss control additive in an amount in the range of from about 25% to about 50% by weight of the fluid loss control additive.

59. The method of claim 48 wherein the cement composition comprises Portland cements, pozzolanic cements, gypsum cements, high alumina content cements, silica cements, or high alkalinity cements.

60. The method of claim 48 wherein the cement composition comprises water present in an amount sufficient to form a pumpable slurry.

61. The method of claim 60 wherein the water is present in the cement composition in an amount in the range of from about 15% by weight of cement to about 200% by weight of cement.

62. The method of claim 48 wherein the cement composition has a density in the range of from about 5 pounds per gallon to about 30 pounds per gallon.

63. The method of claim 48 wherein the cement composition further comprises a weighting agent, a defoamer, a surfactant, mica, fiber, bentonite, microspheres, fumed silica, a salt, vitrified shale, fly ash, a dispersant, a retardant or an accelerant.

64. The method of claim 48 wherein the fluid loss control additive is present in the cement composition in an amount sufficient to provide a desired degree of fluid loss control.

65. The method of claim 48 wherein the fluid loss control additive is present in the cement composition in an amount in the range of from about 0.01% by weight of cement to about 5.0% by weight of cement.

66. The method of claim 48 wherein the hydratable polymer is present in the fluid loss control additive in an amount in the range of from about 0.1% to about 15% by weight of the fluid loss control additive.

67. The method of claim 48 wherein the acrylamide copolymer derivative is present in the fluid loss control additive in an amount in the range of from about 1% to about 99% by weight.

68. The method of claim 48 wherein the iron compound comprises iron chloride.

69. The method of claim 48 wherein the fluid loss control additive further comprises a zeolite.

70. A method of reducing the fluid loss from a cement composition, comprising the step of adding to the cement composition a fluid loss control additive comprising: an acrylamide copolymer derivative; an iron compound; and a hydratable polymer; wherein the acrylamide copolymer derivative comprises a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

71. A method of reducing the fluid loss from a cement composition, comprising the step of adding to the cement composition a fluid loss control additive comprising: an acrylamide copolymer derivative; an iron compound; and a hydratable polymer; wherein the acrylamide copolymer derivative comprises a graft polymer comprising a backbone comprising at least one member selected from the group consisting of derivatized cellulose, polyvinyl alcohol, polyethylene oxide, polypropylene oxide, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

72. A method of reducing the fluid loss from a cement composition, comprising the step of adding to the cement composition a fluid loss control additive comprising: an acrylamide copolymer derivative; an iron compound; a zeolite; and a hydratable polymer.

73. The method of claim 72 wherein the fluid loss control additive further comprises a dispersant.

74. The method of claim 73 wherein the fluid loss control additive comprises iron chloride, an organic acid, a deaggregation agent, silica, or mixtures thereof.

75. The method of claim 74 wherein the iron chloride is present in the fluid loss control additive in an amount sufficient to allow the cement to be suitable for the subterranean temperature of the well being cemented.

76. The method of claim 74 wherein the iron chloride is present in the fluid loss control additive in an amount in the range of from about 5% to about 25% by weight of the fluid loss control additive.

77. The method of claim 74 wherein the iron chloride is anhydrous ferric chloride.

78. The method of claim 74 wherein the organic acid is present in the fluid loss control additive in an amount sufficient to provide a desired degree of viscosity control.

79. The method of claim 74 wherein the organic acid is present in the fluid loss control additive in an amount in the range of from about 0.01% to about 5% by weight of the fluid loss control additive.

80. The method of claim 74 wherein the silica is high surface area amorphous silica.

81. The method of claim 80 wherein the high surface area amorphous silica is present in the fluid loss control additive in an amount sufficient to provide a desired after-set compressive strength.

82. The method of claim 80 wherein the high surface area amorphous silica is present in the fluid loss control additive in an amount in the range of from about 0.1% to about 15% by weight of the fluid loss control additive.

83. The method of claim 74 wherein the de-aggregation agent is present in the fluid loss control additive in an amount sufficient to enable the fluid loss control additive to flow freely as a powder.

84. The method of claim 74 wherein the de-aggregation agent is present in the fluid loss control additive in an amount in the range of from about 1% to about 15% by weight of the fluid loss control additive.

85. The method of claim 73 wherein the fluid loss control additive is present in the cement composition in an amount in the range of from about 0.25% to about 1.5% by weight of the cement; wherein the hydratable polymer is present in the fluid loss control additive in an amount in the range of from about 1.5% to about 4.5% by weight; wherein the acrylamide copolymer derivative is present in the fluid loss control additive in an amount in the range of from about 40% by weight to about 50% by weight; wherein the dispersant is present in the fluid loss control additive in an amount in the range of from about in the range of from about 40% to about 60% by weight; and wherein the zeolite is present in the fluid loss control additive in an amount in the range of from about 1% by weight to about 10% by weight.

86. The method of claim 73 wherein the dispersant comprises a water-soluble polymer prepared by the caustic-catalyzed condensation of formaldehyde with acetone wherein the polymer contains sodium sulfate groups.

87. The method of claim 72 wherein the zeolite further comprises chabazite and amorphous silica.

88. The method of claim 72 wherein the zeolite is present in the fluid loss control additive in an amount in the range of from about 0.1% to about 15% by weight.

89. A method of reducing the fluid loss from a cement composition, comprising the step of adding to the cement composition a fluid loss control additive comprising: an acrylamide copolymer derivative; an iron compound; and a dispersant.

90. The method of claim 89 wherein the acrylamide copolymer derivative comprises a copolymer or copolymer salt of N,N-dimethylacrylamide and 2-acrylamido-2-methylpropane sulfonic acid or acid salts thereof.

91. The method of claim 89 wherein the acrylamide copolymer derivative comprises copolymers or copolymer salts comprising 2-acrylamido-2-methylpropane sulfonic acid or acid salts thereof.

92. The method of claim 91 wherein the copolymers or copolymer salts comprise copolymers of hydrolyzed acrylamide and 2-acrylamido-2-methylpropane sulfonic acid derivatives.

93. The method of claim 89 wherein the iron compound comprises iron chloride.

94. The method of claim 89 wherein the fluid loss control additive further comprises a zeolite.

95. The method of claim 89 wherein the dispersant comprises a water-soluble polymer prepared by the caustic-catalyzed condensation of formaldehyde with acetone wherein the polymer contains sodium sulfate groups.

96. A method of reducing the fluid loss from a cement composition, comprising the step of adding to the cement composition a fluid loss control additive comprising: an acrylamide copolymer derivative; an iron compound; and a dispersant; wherein the acrylamide copolymer derivative comprises a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

97. A method of reducing the fluid loss from a cement composition, comprising the step of adding to the cement composition a fluid loss control additive comprising: an acrylamide copolymer derivative; an iron compound; and a dispersant; wherein the acrylamide copolymer derivative comprises a graft polymer comprising a backbone comprising at least one member selected from the group consisting of derivatized cellulose, polyvinyl alcohol, polyethylene oxide, polypropylene oxide, and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein the alkyl radical comprises at least one member selected from the group consisting of methyl, ethyl and propyl radicals.

98. A method of reducing the fluid loss from a cement composition, comprising the step of adding to the cement composition a fluid loss control additive comprising: an acrylamide copolymer derivative; an iron compound; a hydratable polymer; a zeolite; and a dispersant.

99. The method of claim 98 wherein the iron compound comprises iron chloride.

100. The method of claim 98 wherein the dispersant comprises a water-soluble polymer prepared by the caustic-catalyzed condensation of formaldehyde with acetone wherein the polymer contains sodium sulfate groups.

101. A method of reducing the fluid loss from a cement composition, comprising adding to the cement composition a fluid loss control additive comprising an organic compound and iron chloride, wherein the organic compound comprises copolymers or copolymer salts comprising 2-acrylamido-2-methylpropane sulfonic acid or acid salts thereof.

102. The method of claim 101 wherein the organic compound comprises a copolymer or copolymer salt of N,N-dimethylacrylamide and 2-acrylamido-2-methylpropane sulfonic acid or acid salts thereof.

103. A method of reducing the fluid loss from a cement composition, comprising adding to the cement composition a fluid loss control additive comprising an organic compound and anhydrous ferric chloride.

104. The method of claim 103 wherein the iron compound comprises iron chloride.

105. A method of reducing the fluid loss from a cement composition, comprising adding to the cement composition a fluid loss control additive comprising an organic compound, an iron compound, and a zeolite, wherein the iron compound comprises anhydrous ferric chloride.

106. A method of reducing the fluid loss from a cement composition, comprising adding to the cement composition a fluid loss control additive comprising an iron compound, an acrylamide copolymer derivative, a hydratable polymer, and a dispersant.

107. The method of claim 106 wherein the iron compound comprises iron chloride.

108. The method of claim 106 wherein the iron compound comprises anhydrous ferric chloride.

109. The method of claim 106 wherein the dispersant comprises a water-soluble polymer prepared by the caustic-catalyzed condensation of formaldehyde with acetone wherein the polymer contains sodium sulfate groups.

110. A method of reducing the fluid loss from a cement composition, comprising adding to the cement composition a fluid loss control additive comprising iron chloride, an acrylamide copolymer derivative, a hydratable polymer, and a dispersant.

111. The method of claim 110 wherein the iron chloride comprises anhydrous ferric chloride.

112. The method of claim 110 wherein the dispersant comprises a water-soluble polymer prepared by the caustic-catalyzed condensation of formaldehyde with acetone wherein the polymer contains sodium sulfate groups.

113. A method of reducing the fluid loss from a cement composition, comprising adding to the cement composition a fluid loss control additive comprising an acrylamide copolymer derivative and iron chloride.

114. A method of reducing the fluid loss from a cement composition, comprising adding to the cement composition a fluid loss control additive comprising an organic compound and an iron salt, wherein the organic compound comprises an acrylamide copolymer derivative.

115. The method of claim 114 wherein the iron salt comprises iron chloride.

116. The method of claim 114 wherein the iron salt comprises anhydrous ferric chloride.

117. The method of claim 114 wherein the fluid loss control additive further comprises a zeolite.

118. The method of claim 117 wherein the zeolite comprises chabazite and amorphous silica.

119. The method of claim 114 wherein the organic compound comprises an acrylamide copolymer derivative and a dispersant.

120. The method of claim 119 wherein the organic compound further comprises a hydratable polymer.

121. The method of claim 119 wherein the dispersant comprises a water-soluble polymer prepared by the caustic-catalyzed condensation of formaldehyde with acetone wherein the polymer contains sodium sulfate groups.

122. The method of claim 114 wherein the organic compound comprises an acrylamide copolymer derivative and a hydratable polymer.

* * * * *